Figure 2:
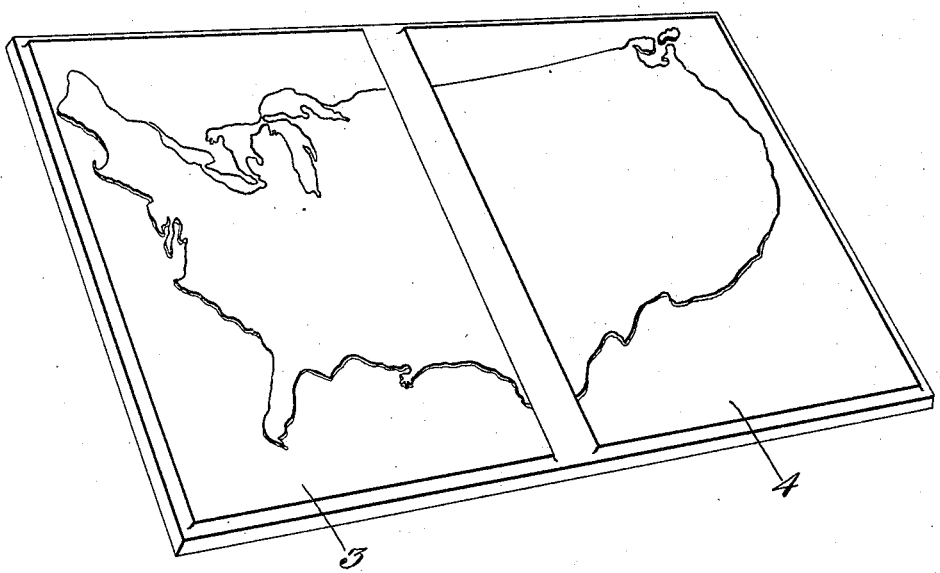

W. H. GREELEY.
MAP PLATE.
APPLICATION FILED MAR. 26, 1921.
1,383,622.
Patented July 5, 1921.
2 SHEETS—SHEET 1.
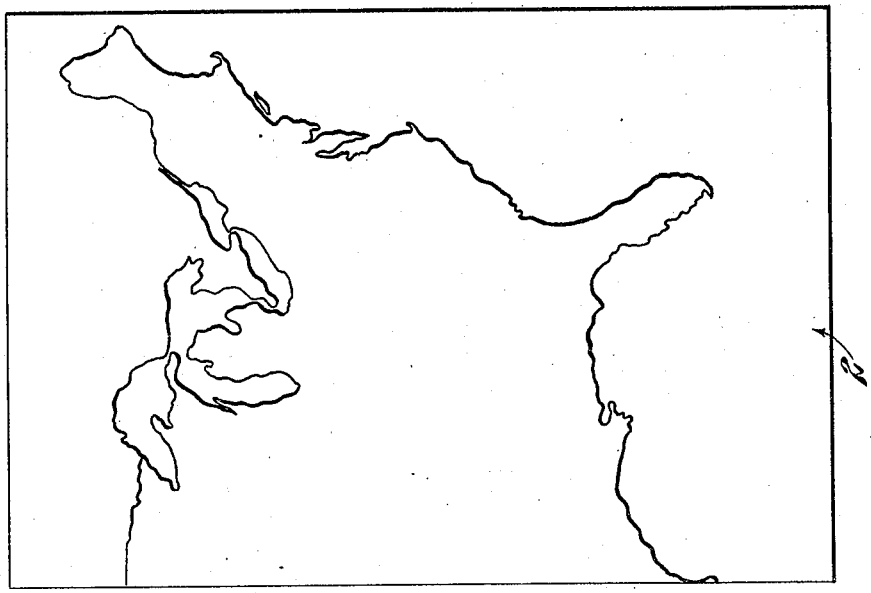
FIG. 1.
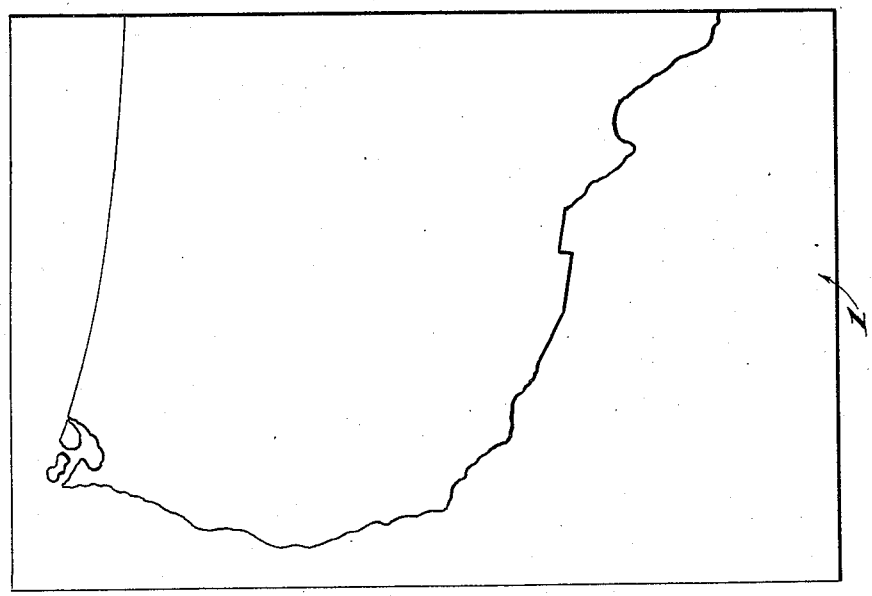

W. H. GREELEY.
MAP PLATE.
APPLICATION FILED MAR. 26, 1921.

1,383,622.

Patented July 5, 1921.
2 SHEETS—SHEET 2.

UNITED STATES PATENT OFFICE.

WILLIAN H. GREELEY, OF NEWTON, MASSACHUSETTS, ASSIGNOR TO GINN AND COMPANY, OF BOSTON, MASSACHUSETTS, A COPARTNERSHIP.

MAP-PLATE.

1,383,622.   Specification of Letters Patent.   Patented July 5, 1921.

Application filed March 26, 1921. Serial No. 456,018.

*To all whom it may concern:*

Be it known that I, WILLIAN H. GREELEY, a citizen of the United States, residing at Newton, in the county of Middlesex and State of Massachusetts, have invented certain new and useful Improvements in Map-Plates; and I do hereby declare the following to be a full, clear, and exact description of the invention, such as will enable others skilled in the art to which it appertains to make and use the same.

The present invention relates to map plates, and more particularly to map plates for printing double-page maps.

Heretofore double-page maps have been printed on one sheet, the map running continuously from side margin to side margin of the sheet. The map thus produced was folded vertically at the middle and tipped in in the process of binding the book. This method of binding in a double-page map is expensive because of the additional labor involved in tipping in the map which was required to be pasted to a guard or leaf in the process of being bound. It has also been proposed to make double-page maps in two parts and to print them on the same or separate sheets of paper and bind them in a book face to face, with margins on their inner sides for binding purposes. Where these were printed on one sheet of paper, the difficulty was to secure the correct positioning of the two parts of the map with relation to each other on the bed of the press, as in order to secure such correct positioning it was required that the pressman should position the two parts in correct horizontal alinement with each other. This was a matter requiring such nicety of manipulation and accuracy of position as to be difficult in ordinary work to secure. Where the two parts of the map were printed on separate sheets of paper, the inaccuracies of folding or the inequalities of top and bottom margins would more often result in inaccuracy of horizontal alinement than in accuracy thereof, with the result that it was commercially difficult to secure correct horizontal alinement of the two map portions in the bound book. The object of the present invention is to produce the improved map plate hereinafter described and particularly defined in the claim.

The accompanying drawing illustrates diagrammatically in Figure 1 the impression from a plate constructed according to the present invention, and Fig. 2 illustrates the plate.

The plate forming the subject of this invention is made in two halves, the one plate for printing the left hand part 1 of the map, and the other for printing the right hand part 2 of the map, each of which is of impression area. These two plates are made separately, and are then fixed in correct position with relation to each other so that their inner edges are separated a double margin distance from each other, that is, a distance such that when the book containing the printed map is opened, the adjacent edges of the two portions will be close to each other and have their top and bottom edges in correct horizontal alinement, whereupon the two plates are united together by a strip of metal soldered to the adjoining edges of the two plates which unites and holds them rigidly in correct position with relation to each other. As a modification, the two plates might be united together in other ways, as, for example, by being tacked to a block. The two plates thus united together are then used for printing the maps, or, more often, are used in making the electrotype which is used to print from. The plates thus prepared consists, it will be seen, of two rigidly united portions 3 and 4 in horizontal alinement and separated from each other by a double margin distance, so that when the paper printed from this plate is bound in a book, it secures the correct horizontal alinement of the two opposed pages together forming in effect a single map. When thus bound, the two parts of the map are separated from each other such a distance that when the book is opened, the bending of the leaves brings the adjacent edges of the two map portions into close and accurate position with relation to each other.

This plate is adapted for use in printing a double-page map in a single color, and also for printing the control impression of a double-page multi-color map.

The advantages derived from the use of this map plate comprise the saving effected by the elimination of the pasting operations of tipping in a map, and securing the advantage of correct alinement of the two map parts with relation to each other. While this map plate may be used for printing maps for use in sewed books, it is of more importance, and of greater advantage practically in making stitched books. In a book of the character of a sewed book, the continuous double-page map may be mounted on a guard or leaf which is sewed into the book, which form of map comports with the character of a sewed book. But in a stitched book, which does not open up as fully as a sewed book, the use of maps made from plates of this invention insures a great saving in expense, and produces a map which is adapted to the style of the book, and which, when the book is opened and the map spread, presents the map in good position for reading.

Having thus described the invention, what is claimed is:

A map plate for use in making double-page maps, consisting of two parts, each of impression area, having their inner edges separated from each other double margin distance, and rigidly united together in such relative position.

WILLIAN H. GREELEY.